US00RE37319B1

(19) United States
(12) Reissued Patent
Meiselman

(10) Patent Number: US RE37,319 E
(45) Date of Reissued Patent: *Aug. 14, 2001

(54) BOOT FOR SNOWBOARDING AND THE LIKE

(75) Inventor: Jamie Meiselman, South Burlington, VT (US)

(73) Assignee: K-2 Corporation, Vashon, WA (US)

( * ) Notice: This patent is subject to a terminal disclaimer.

(21) Appl. No.: 09/354,130

(22) Filed: Jul. 15, 1999

Related U.S. Patent Documents

Reissue of:
(64) Patent No.: 5,647,148
Issued: Jul. 15, 1997
Appl. No.: 08/642,311
Filed: May 3, 1996

(63) Continuation of application No. 08/437,356, filed on May 9, 1995, now Pat. No. 5,636,455, which is a continuation of application No. 08/264,427, filed on Jun. 23, 1994, now Pat. No. 5,435,080, which is a continuation of application No. 07/993,238, filed on Dec. 17, 1992, now abandoned.

(51) Int. Cl.[7] ..... A43B 5/04
(52) U.S. Cl. ..... 36/115; 36/88; 36/45; 36/117.1; 280/14.2
(58) Field of Search ..... 36/117.1, 115, 36/88, 45, 114, 118.7, 118.2; 280/14.2

(56) References Cited

U.S. PATENT DOCUMENTS 3,597,862 * 8/1971 Vogel .
3,807,062 * 4/1974 Spier .
3,854,743 * 12/1974 Hansen .
3,984,124 * 10/1976 Gertsch .
4,308,674 * 1/1982 Tessaro .
4,453,727 * 6/1984 Bourque .
4,531,309 * 7/1985 Bandenberg et al. .
4,638,578 * 1/1987 Eiteljorg, II .
4,707,874 * 11/1987 Champagne ..... 36/4
4,741,550 * 5/1988 Dennis ..... 280/14.2
4,979,760 * 12/1990 Derrah .
5,044,654 * 9/1991 Meyer ..... 280/14.2
5,193,294 * 3/1993 Pozzobon .

* cited by examiner

*Primary Examiner*—M. D. Patterson
(74) *Attorney, Agent, or Firm*—Christensen O'Connor Johnson Kindness PLLC

(57) ABSTRACT

An improved boot for snowboarding. In accordance with one aspect of the present invention, there is provided a generally resilient upper boot portion mounted to a generally rigid lower boot portion. The lower boot portion extends substantially upwardly from the sole, over the foot, and ends proximate to the tarsal bone of the lower ankle. A calf support member is mounted at the heel of the boot and relatively perpendicular thereto. A lip extends from the toe and heel of the boot lower portion. Upon cooperation of the lip with plate bindings on a snowboard, the boot is releasably secured thereto.

12 Claims, 3 Drawing Sheets

BOOT FOR SNOWBOARDING AND THE LIKE

Matter enclosed in heavy brackets [ ] appears in the original patent but forms no part of this reissue specification; matter printed in italics indicates the additions made by reissue.

This Application is a continuation of pending application Ser. No. 08/437,356, filed May 9, 1995, *now U.S. Pat. No. 5,636,455* which is a continuation of Ser. No. 08/264,427, filed Jun. 23, 1994, now U.S. Pat. No. 5,435,080, which, in turn, is a continuation of Ser. No. [08]*07*/993,238, filed Dec. 17, 1992, now abandoned.

The invention relates to footwear and more particularly to a boot assembly for securing a snowboarder's foot to a snowbound or the like and a method of assembling the same.

A snowboard is a single board, akin to a surfboard, that is used to slide down a snow covered slope without the need for skis or ski pates, but with greater agility and control.

To maneuver a snowboard, it is desireable that snowboarders be able to bend their ankles forward and from side to side, much in the same way surfers bend their ankles to maneuver a surfboard. Lateral and forward ankle movements are relatively important for both freestyle (acrobatic) and freeriding (all-terrain) snowboarding.

Conventional boots used for snowboarding, like ski boots, comprise a "hard boot" or hard plastic molded boot shell that restricts movement of the snowboarder's ankles. This hard shell construction is relatively convenient in allowing the snowboarder to use plate bindings for quick release of the boot from the snowboard. However, by restricting ankle movement, maneuverability of the snowboard is limited.

Other boots known as "soft boots" are constructed of a soft, flexible material such as leather, and are typically retrofitted to the snowboard by highback bindings. With highback bindings, two or three buckles must be opened to remove the boot from the snowboard, whereas with plate bindings only one buckle must be opened. Although this construction allows the ankle to move relatively free and thus facilitates maneuverability, highback bindings have been found less convenient than the "hard boot" construction.

The present invention provides an improved boot for snowboarding which comprises a generally rigid lower boot portion and a generally resilient upper bag portion. The lower boot portion extends substantially upwardly from the sole and over the foot, ending proximate to the tarsal bone of the lower ankle. A calf support member is mounted at the heel of the boot and relatively perpendicular thereto. A lip extends from the toe and heel of the boot lower portion. Upon cooperation of the Up with plate bindings on a snowboard, the boot is releasably secured thereto.

The present invention is further directed to a method of assembling a boot, which comprises the steps of mounting a generally resilient upper boot portion to a generally rigid lower boot portion, the lower boot portion extending substantially upwardly from the sole, over the foot, and ending proximate to the tarsal bone of the lower ankle; and mounting a calf support member at the heel of the boot relatively perpendicular thereto.

Accordingly, it is an object of the present invention to provide simple, durable, economical and comfortable footwear for snowboarding which provides both improved snowboard maneuverability and the convenience of plate bindings.

The present invention will now be further described by reference to the following drawings which are not to be deemed limitative in any manner thereof.

The same numerals are used throughout the various figures of the drawings to designate similar parts.

Still other objects and advantages of the present invention will become apparent from the following description of the preferred embodiments.

Figure 1:
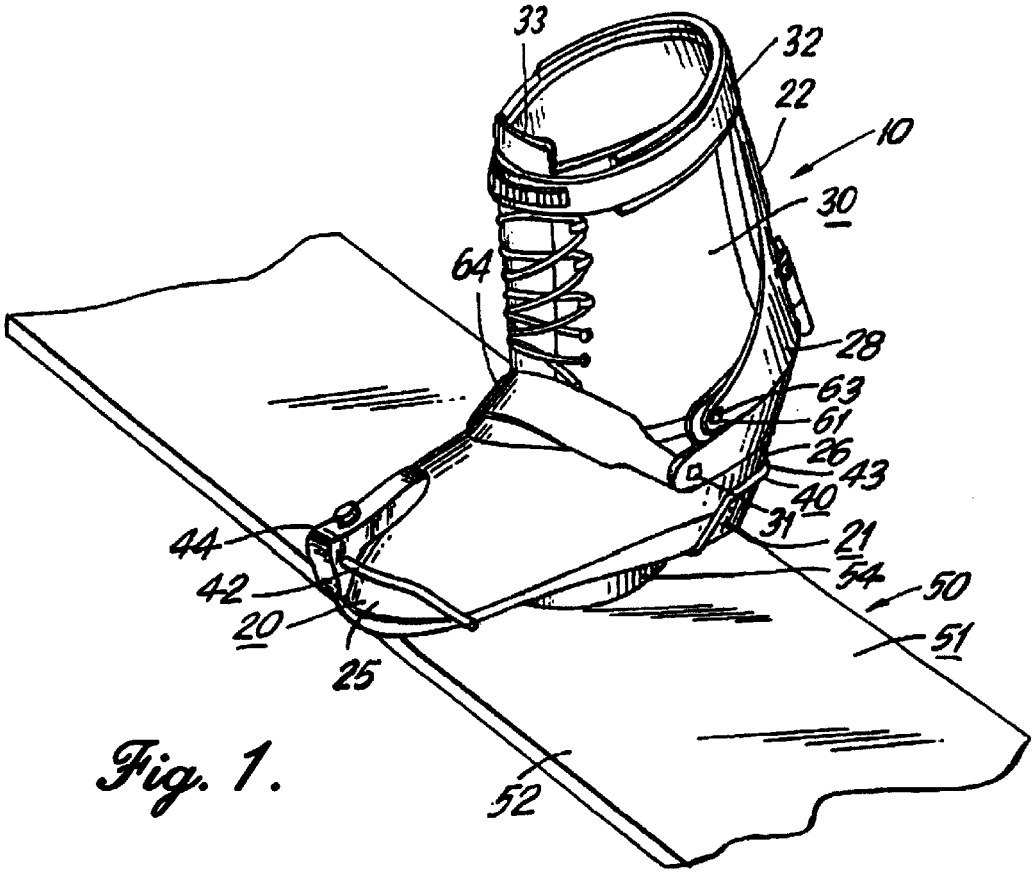
FIG. 1 is a perspective view of a boot assembly, plate binding and snowboard in a secured position, in accordance with one aspect of the present invention.
Figure 2:
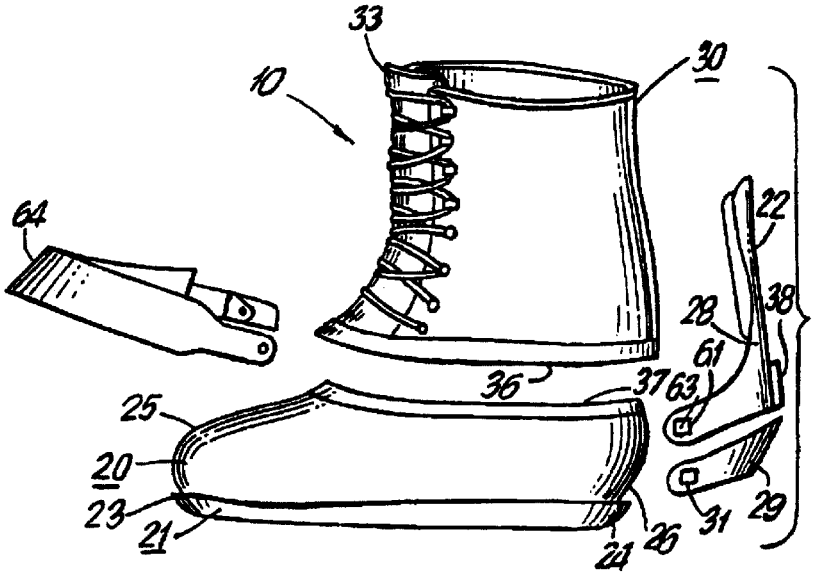
FIG. 2 is an exploded side view of the door assembly of FIG. 1.

FIGS. 1 and 2 illustrate generally an improved boot 10 for snowboarding in accordance with one aspect of the present invention. The boot comprises a generally rigid lower boot shell or portion 20 and a generally resilient upper boot portion 30. The lower boot portion extends substantially upwardly from sole 21 of the shell and over the foot of a snowboarder, ending proximate to the tarsal bone of the lower ankle. It has been found that a lower boot portion approximately 1–5 inches high provides for complete mobility of the snowboarder's ankle.

A calf support member 22 is mounted, e.g., by rivets, at the heel of the boot and relatively perpendicular thereto. A lip 23. 24 extends from the toe 25 and heel 26 of the boot lower portion. Upon cooperation of the Up with plate bindings 40 on a snowboard 50, the boot is releasably secured thereto.

Figure 5:
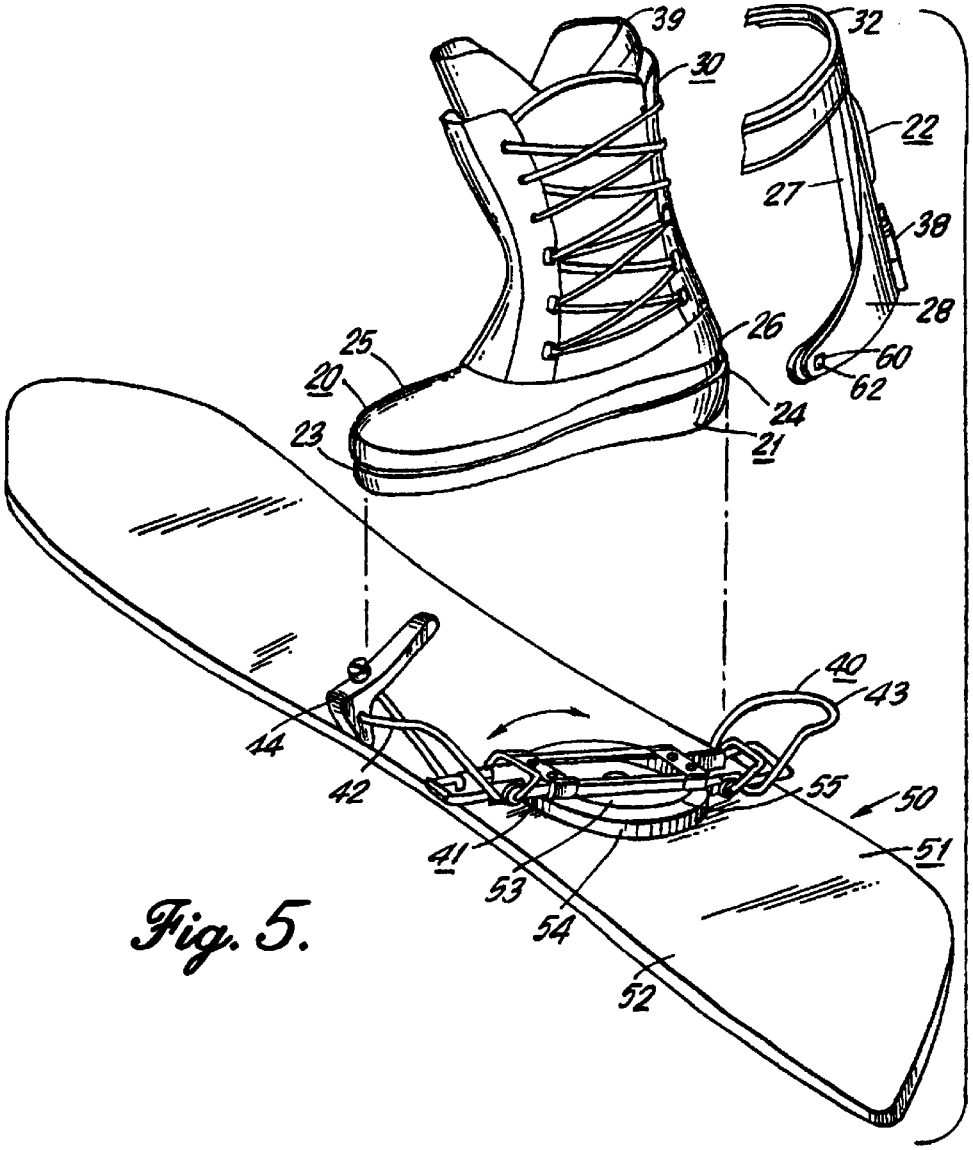
FIG. 5 is a perspective view of a boot assembly, plate binding and snowboard in an unsecured position in accordance with another aspect of the present invention.

The snowboard, in accordance with one aspect of the present invention, is a relatively rigid, smooth and flat strip 51 having the general shape of a tongue depressor, as best seen in FIG. 5. Plate bindings 40 are mounted in pairs to upper surface 52 of the snowboard in proximity to its center. Each binding is oriented such that, upon cooperation with a boot the snowboarder's feet are oriented sideways (or perpendicular) relative to the snowboard length.

Each plate binding 40 comprises a relatively rectangular frame 41 rotatably mounted face-to-face with upper surface 52. Bails 42, 43 are pivotally mounted to the frame using suitable fasteners, e.g., rivets or a nut and bolt arrangement. One bail 42 is mounted at the toe end of the rectangle and the other bail 43 at the heel end of the rectangle. An L-shaped brace bar 44 is pivotally mounted to the toe bail.

The boot is placed lengthwise within the frame, fitting the heel of the boot in bail 43 and the boot toe in bail 42. Toe bail 42 is then folded over the front end of the boot, and the forward end of the brace bar is pressed in toe lip 23 of the boot. Next the aft of the brace bar is pressed downwardly, and snapped over the front of the boot as shown in FIG. 1. In this manner, the boot is releasably secured to the snowboard.

For example, the plate binding is rotatably mounted to the snowboard upper surface by a rotatable disk 53 fastened at its center to the snowboard. The binding is thereby rotatable about a vertical axis perpendicular a upper surface 52. A generally circular raised portion 54 on the snowboard is adapted to receive the disk and is relatively flush therewith. The disk fits aside a like shaped though slightly larger diameter recess 55 in the raised portion. In this manner, the disk (and plate binding) are raised a selected distance off the snowboard upper surface to facilitate rotation or pivotal movement of the plate binding and the boot over and generally parallel to the snowboard upper surface.

As shown in FIGS. 1–4, calf support member 22 comprises a relatively stiff spoiler, preferably constructed of a strong, light-weight material, e.g., nylon or other polymeric material. The member has a generally flat profile for accommodating lateral movements of the snowboarder's ankle (and leg). Calf facing portions 27 of the member mount a shock absorbing material, preferably at points of contact between the snowboarder's calf and the member. Suitable materials include foam padding and Spenco® Gel.

The member has an arcuate shape of sufficient radius to fit securely around the boot heel At each end of the arc are first holes 60, 61 for receiving suitable fasteners 62, 63. In this manner, the member is attached at the heel to opposing sides of the box lower portion. Preferably, the member is constructed of a relatively strong, stiff and light-weight material such as Aluminum or nylon.

Figure 3:
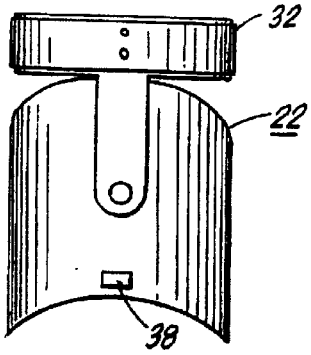
FIG. 3 is a plan view of a calf support member in accordance with another aspect of A present invention.
Figure 4:
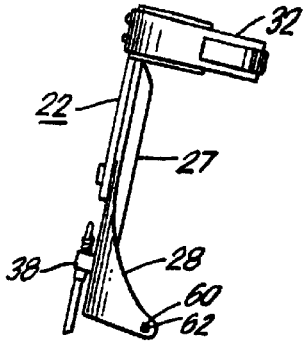
FIG. 4 is a side view of the calf support member of FIG. 3.

In an alternative embodiment of the present invention, a rotatable shin strap 32 is mounted at the upper end of the calf support member, as No seen in FIGS. 3 and 4. This feature provides increased support during turns and other maneuvers of the snowboard.

In another embodiment of the present invention, a highback support seat member 29 is mounted to the bed of the boot lower portion on opposing sides by suitable fasteners 31, e.g., rivets. The seat member has a generally U-shape. The calf support member preferably rests directly on top of the seat member for adding support strength and rigidity to the boot lower portion.

The snowboarder's foot and heel am held down within the boot by an ankle strap 64. The strap extends over and across the forefoot from one seat member fastener 31 to the other. An adjustment device such as a ratchet buckle system 46 is used to tighten down the strap over the foot in order to prevent the foot from lifting out of the boot.

Figure 6:
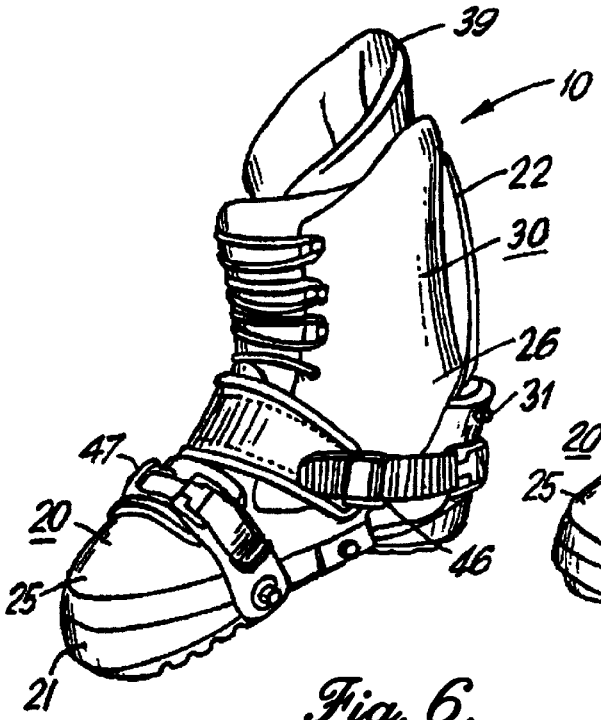
FIG. 6 is a perspective view of a boot assembly in accordance with still another aspect of the present invention.
Figure 7:
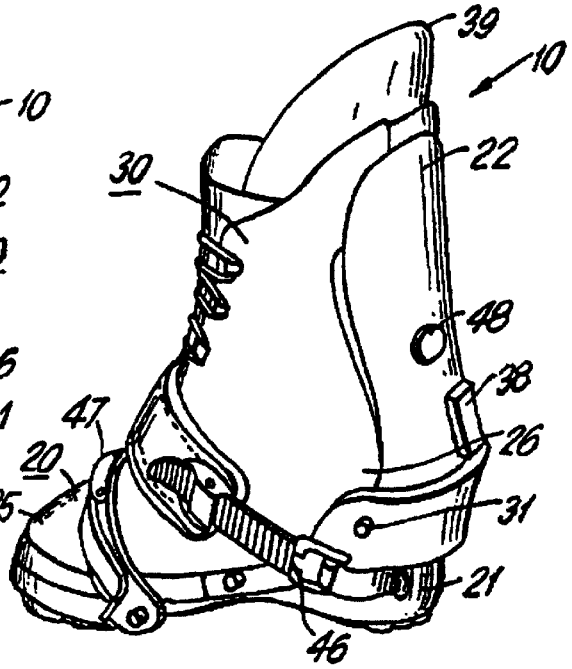
FIG. 7 is a rear perspective view of the boot assembly shown in FIG. 6.

In another alternative embodiment of the present invention, an additional ratchet buckle strap 47 is used to secure the foot inside the boot. AS shown in FIGS. 6 and 7, the strap is positioned generally about the toe of the boot lower portion, and secured at each side of the sole 21. In this manner, additional support is provided to prevent the foot from lifting out of the boot. A dial 48 at the boot rear allows variation in tightening of he strap and removal of the boot without undoing the buckle straps.

Figure 8:
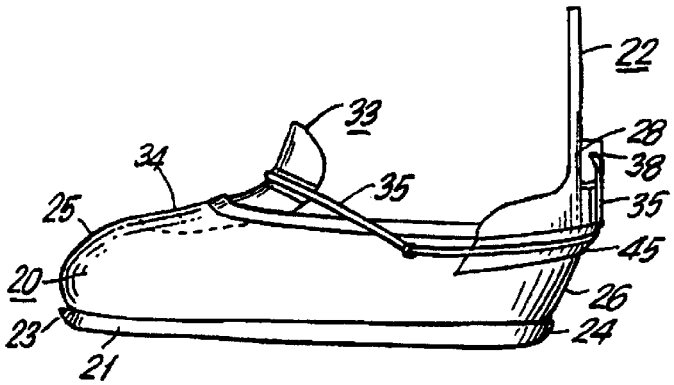
FIG. 8 is a side view of a boot lower portion and highback support, in accordance with another aspect of the present invention.

Alternatively, an internal tongue system 33 may be used instead to prevent the foot from lifting out of the boot. As best seen in FIG. 8, the system includes a thin, flexible plastic tongue 34 that curves from the forefoot (beneath the adjacent boot lower portion) to a selected distance up the front of the ankle, e.g., approximately two inches. A relatively thin cable 35, e.g., ok steel, wraps over the tongue and about the rear of the boot, threading through a channel 45 along the highback support, for holding the tongue down against liner 39. Tension of the cable is varied by movement of a dial a buckle on the calf support member (or rear of the highback support).

A forward lean adjustment member 38 is formed at the bottom mar 28 of the calf support member, proximate to but below the snowboarder's ankle.

To adjust the range of forward lean allowed by the boot, the calf support member is provided with three holes and the adjustment member is provided 46 a pair a second holes. This permits mounting of de adjustment member it four different combinations and/or orientations. The first is with the support member right-side-up in be top two holes of the lean member. The second is also with the support member right-side-up but in the bottom two holes of the forward lean member. The third is with the support member up-side-down in the top two holes of the lean member. The fourth and final possibility is with the support member up-side-down, but in the bottom two holes of the lean member Although the present invention is shown and described as having a specified number of holes in the calf support and lean adjustment members, it is understood by those skilled in the art that any number of holes or means for adjusting forward lean could be utilized, giving consideration to the purpose for which the present invention is intended.

It is preferred that the boot be lined by a material which provides comfort and insulation, while allowing the foot to remain securely in the boot. Air-filled bladder type liners and padded neoprene liners, for example, have been found suitable or this purpose.

A traditional tongue and lacing system is used to tighten the boot about the foot and leg. The tongue runs up the front of the boot upper portion and is preferably lined with a resilient material such as foam padding or Spence® Gel for added support and comfort. Alternatively as shown in FIG. 5, the tongue and lacing system are on one or both sides of the boot upper portion, for improved comfort. In addition to laces, zippers and Velcro® have also been found suitable.

The upper aid lower bout portions are joined along their continuous lower 36 and upper 37 edges, respectively, by any suitable method for example, by stitching or glue. The lower and upper edges are suitably configured for cooperation with one another such that a water-tight seal is formed therebetween for adequate insulation and support.

Preferred materials or constructing the lower portion include a rigid plastic and for the boot upper portion include leather or nylon. However, it is understood by those skilled in the art that any material or combination of materials could be used, giving consideration to the intended purpose of the present invention.

In accordance with another aspect of the present invention, the boot is assembled by mounting the upper boot portion to the lower boot portion along their respective upper and lower edges, the lower bat portion extending substantially upwardly from the sole and over the foot, and ending proximate to the tarsal bone of the lower ankle, Next, the calf support member is mounted relatively perpendicular to the heel of the boot.

In accordance with still another aspect of the present invention, the ankle strap, eg., ratchet buckle system, is then extended over and across the forefoot and fastened each side of the sole. An additional strap, ratchet buckle system is positioned generally about the toe of the boot lower portion, and also secured to each side of the sole.

This novel boot construction provides the best of both worlds. In particular, the flexible boot upper portion advantageously permits the snowboarder's ankles to bend forward and from side to side, for ease of snowboard maneuverability and comfort. The relatively rigid boot lower portion facilitates use of plate bindings for ready securement (or detachment) of the boot to the snowboard.

Since from the foregoing the construction and advantages of the invention may be readily understood, further explanation is believed to be unnecessary. However, since numerous modifications will readily occur to those skilled in the art after consideration of the foregoing specification and accompanying drawings, it is not intended that the invention be limited to the exact construction shown and described, but all suitable modifications and equivalents may be resorted to which fall within the scope of the appended claims.

What is claimed is:

1. An improved boot in combination with a snowboard having plate bindings, the boot comprising:

a rigid lower boot portion and a one piece resilient upper box portion for providing lateral and medial flexing of a user's ankle, the lower boot portion extending substantially upwardly from a sole and over a foot, and ending proximate to the tarsal bone of the lower ankle, a calf support member mounted to the lower boot portion and extending from a heel portion towards a top portion of the boot, a support seat member mounted to the lower boot portion and supporting the calf support member, an adjustable ankle strap mounted to the support seat member, the strap extending over and across the forefoot, for holding the user's foot and heel within the boot, and a means comprising a member for adjusting forward lean of the calf support member.

2. An improved boot in combination with a snowboard having plate bindings, the boot comprising:

a rigid lower boot portion and a one piece resilient upper boot portion for providing lateral and medial flexing of a user's ankle, the lower boot portion extending substantially upwardly from a sole and over a foot, and ending proximate to the tarsal bone of the lower ankle, a calf support member mounted to the lower boot portion and extending from a heel portion towards a top portion of the boot, a support seat member mounted to the lower boot portion and supporting the calf support member, an adjustable ankle strap mounted to the support seat member, the strap extending over and across the forefoot, for holding the user's foot and heel within the boot, a means comprising a member for adjusting forward lean of the calf support member, and an adjustable tongue system for retaining the foot in the boot.

*3. An improved boot in combination with a snowboard having a bindings for securement of the boot thereto for snowboarding, the boot comprising:*

*a rigid lower boot portion and a one piece resilient upper boot portion for providing lateral and medial flexing of a user's ankle, the lower boot portion extending substantially upwardly from a sole and over a foot, and ending proximate to the tarsal bone of the lower ankle,*

*a calf support member mounted to the lower boot portion and extending from a heel portion towards a top portion of the boot,*

*a support seat member mounted to the lower boot portion and supporting the calf support member,*

*an adjustable ankle strap mounted to the support seat member, the strap extending over and across the forefoot, for holding the user's foot and heel within the boot, and*

*a means comprising a member for adjusting forward lean of the calf support member.*

*4. The boot of claim 3 further comprising an adjustable tongue system for retaining the foot in the boot.*

*5. An improved boot in combination with a snowboard having bindings for securement of the boot thereto, the boot comprising:*

*a lower boot portion having a rigid portion extending from a first attachment point with said bindings to a heel portion of said lower boot portion and a one piece resilient upper boot portion for providing lateral and medial flexing of a user's ankle, the lower boot portion extending substantially upwardly from a sole and ending proximate to the tarsal bone of the lower ankle,*

*a calf support member mounted to the lower boot portion and extending from said heel portion towards a top portion of said boot;*

*a support seat member mounted to the lower boot portion and supporting the calf support member;*

*an adjustable ankle strap mounted to the support seat member, the strap extending over and across the forefoot, for holding the user's foot and heel within the boot, and*

*a means comprising a member for adjusting forward lean of the calf support member.*

*6. The boot of claim 5 further comprising an adjustable tongue system for retaining the foot in the boot.*

*7. The boot of claim 6 wherein the boot is attached to the binding at a second attachment point wherein the first attachment point is distal to the heel portion and the second attachment point is proximal to the heel portion.*

*8. The boot of claim 5 wherein the boot is attached to the binding at a second attachment point wherein the first attachment point is distal to the heel portion and the second attachment point is proximal to the heel portion.*

*9. An improved boot in combination with a snowboard, having bindings for securement of the boot thereto, the boot comprising:*

*a lower boot portion including a generally rigid portion extending between a first attachment point and a second attachment point with said bindings and a resilient upper boot portion for providing lateral and medial flexing of a user's ankle, the lower boot portion extending substantially upwardly from a sole and ending proximate to the tarsal bone of the lower ankle,*

*a calf support member mounted to the lower boot portion and extending from a heel portion towards a top portion of said boot;*

*a support seat member mounted to the lower boot portion and supporting the calf support member;*

*an adjustable ankle strip mounted to the support seat member, the strap extending over and across the forefoot, for holding the user's foot and heel within the boot, and*

*a means comprising a member for adjusting forward lean of the calf support member.*

*10. The boot of claim 9 wherein the first attachment point is distal to the heel portion of the lower boot portion and said second attachment point is proximal to the heel portion.*

*11. An improved boot in combination with a snowboard having quick-release bindings for securement of the boot thereto, the boot comprising:*

*a lower boot portion including a generally rigid portion extending between a first attachment point and a second attachment point with said bindings and a resilient upper boot portion for providing lateral and medial flexing of a user's ankle, the lower boot portion extending substantially upwardly from a sole and ending proximate to the tarsal bone of the lower ankle,*

*a calf support member mounted to the lower boot portion and extending from a heel portion towards a top portion of said boot;*

*a support seat member mounted to the lower boot portion and supporting the calf support member;*

*an adjustable ankle strap mounted to the support seat member, the strap extending over and across the forefoot, for holding the user's foot and heel within the boot, and*

*a means comprising a member for adjusting forward lean of the calf support member.*

*12. An improved boot in combination with a snowboard having bindings on which only a single buckle need be opened to release a boot therefrom, the boot comprising:*

*a lower boot portion including a generally rigid portion extending between a first attachment point and a second attachment point with said bindings and a resilient upper boot portion for providing lateral and medial flexing of a user's ankle, the lower boot portion extending substantially upwardly from a sole and ending proximate to the tarsal bone of the lower ankle,*

*a support member mounted to the lower boot portion and extending from a heel portion towards a top portion of said boot;*

*seat member mounted to the lower boot portion and supporting the calf support member;*

*an adjustable ankle strap mounted to the support seat member, the strap extending over and across the forefoot, for holding the user's foot and heel within the boot, and*

*a means comprising a member for adjusting forward lean of the calf support member.*

* * * * *

UNITED STATES PATENT AND TRADEMARK OFFICE

CERTIFICATE OF CORRECTION

PATENT NO. : RE 37,319 E
DATED : August 14, 2001
INVENTOR(S) : J. Meiselman

It is certified that error appears in the above-identified patent and that said Letters Patent is hereby corrected as shown below:

Column 5,
Line 10, "box" should read -- boot --
Line 47, "*having a bindings*" should read -- *having bindings* --

Column 6,
Line 33, "*with a snowboard*," should read -- *with a snowboard* --
Line 49, "*strip*" should read -- *strap* --

Column 8,
Line 5, "a support" should read -- a calf support --
Line 8, "seat number" should read -- a support seat member --

Signed and Sealed this

Third Day of June, 2003

JAMES E. ROGAN
*Director of the United States Patent and Trademark Office*